United States Patent Office 3,201,379
Patented Aug. 17, 1965

3,201,379
THREE-COMPONENT METAL HYDRIDE-TRANSITION METAL HALIDE CATALYST AND OLEFIN POLYMERIZATION PROCESS THEREWITH
Harry W. Coover, Jr., and Frederick B. Joyner, Kingsport, Tenn., assignors to Eastman Kodak Company, Rochester, N.Y., a corporation of New Jersey
No Drawing. Filed Dec. 23, 1960, Ser. No. 77,835
The portion of the term of the patent subsequent to Sept. 1, 1981, has been disclaimed and dedicated to the Public
18 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high density using a particular catalyst combination which has unexpected catalytic activity and which gives products characterized by unusually high crystallinity, softening point, thermal stability, stiffness and being substantially free of non-crystalline polymers.

This application is a continuation-in-part of our copending application, Serial No. 724,912, filed March 31, 1958, and now U.S. Patent 2,967,856.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000 to 1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Some of the catalysts that are effective for producing crystalline high density polyethylene cannot be used to produce a similar type of polypropylene. For example, catalyst combinations of metal hydrides with transition element compounds have been suggested for ethylene polymerization, but these catalysts are relatively ineffective for polymerizing propylene to form high density crystalline polymers. Thus, one cannot predict whether a specific catalyst combination will be effective to produce crystalline high density polymers with specific α-olefins.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpected catalytic activity for the polymerization of α-monoolefins to form crystalline high density polymers. Other objects will be apparent from the description and claims which follow.

The above and other objects are attained by means of this invention wherein olefins, either singly or in admixture, are readily polymerized to high molecular weight solid polymers by effecting the polymerization in the presence of a catalytic mixture containing a hydride of a Group Ia or Group IIa metal, a halide of a transition metal selected from the group consisting of titanium, zirconium, vanadium, chromium and molybdenum, the halogen atoms being chlorine, bromine or iodine, and an amide as a third component. The amide can have the structural formula:

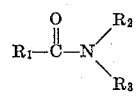

wherein $R_1$ is a radical selected from the group consisting of hydrogen, alkyl radicals containing from 1 to 20 carbon atoms, phenyl, carboxyl, alkoxy, —N(R)$_2$ wherein R is an alkyl radical containing 1 to 4 carbon atoms, and

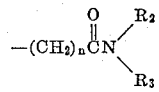

wherein $n$ is an integer of 1 to 4, and each of $R_2$ and $R_3$ is a radical selected from the group consisting of hydrogen, alkyl radicals containing 1 to 8 carbon atoms, phenyl and cyclohexyl.

The amide third component of the catalyst can have the structural formula

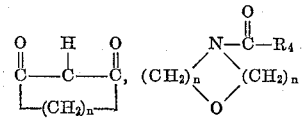

and

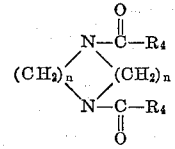

wherein $n$ is an integer of 1 to 4 and $R_4$ is a radical selected from the group consisting of alkyl radicals containing 1 to 4 carbon atoms and phenyl.

Other third components that can be employed in the catalyst are phosphorus-containing amides having the structural formulas:

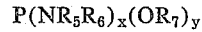

and

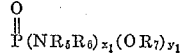

wherein $x$ and $y$ are whole numbers from 1 to 3 and 0 to 2 respectively, the sum of $x$ and $y$ being 3, and $x_1$ and $y_1$ are whole numbers from 1 to 2, the sum of $x_1$ and $y_1$ being 3, and $R_5$, $R_6$ and $R_7$ are alkyl radicals containing 1 to 8 carbon atoms.

Amide third components that can be used in the catalyst system are N,N-dimethylformamide, N,N-dimethylacetamide, N,N-diethylacetamide, N-cyclohexylacetamide, N-t-butylbenzamide, N-methyl-N-phenylacetamide, N-benzylacetamide, n-heptamide, palmitamide, stearanilide, acetanilide, isobutyramide, N,N'-di-t-butylurea, tetramethylurea, succinimide, N,N,N',N' - tetramethyladipamide, N-methylisobutyramide, N-benzoylmorpholine, N,N' - diacetylpiperazine, n - butyloxamate, ethyloxanilate, ethyl carbamate, diethyl N-dimethylamidophosphate, ethyl N,N-tetraethyl amidophosphate, diethyl N-dimethyl amidophosphite, ethyl N,N-tetraethyl diamidophosphite, N,N,N-hexaethyl triamidophosphite, dibutyl N-dipropyl amidophosphate, n-pentyl N,N-tetrabutyl amidophosphate, dipropyl N-dioctyl amidophosphite, n-hexyl, N,N-tetrabutyl diamidophosphite, N,N,N-hexa(n-hexyl)triamidophosphite.

Catalyst mixtures that can be employed in practicing our invention are:

(a) Lithium hydride, titanium trichloride and N-cyclohexylacetamide.
(b) Lithium aluminum hydride, titanium tetrachloride and N-methyl-N-phenylacetamide.
(c) Calcium hydride, zirconium tetrachloride and palmitamide.
(d) Sodium hydride, zirconium tetrabromide and acetanilide.
(e) Sodium aluminum hydride, vanadium trichloride and isobutyramide.
(f) Lithium aluminum hydride, molybdenum pentachloride and N,N'-di-t-butylurea.
(g) Potassium hydride, titanium tetraiodide and ethyl carbamate.
(h) Barium hydride, titanium trichloride and ethyl N,N-tetraethyl amidophosphate.
(i) Sodium hydride, vanadium tribromide and dimethyl N-dimethyl amidophosphate.
(j) Calcium hydride, titanium trichloride and N,N,N-hexamethyl triamidophosphite.
(k) Lithium aluminum hydride, titanium tetrachloride and dimethyl N-dimethyl amidophosphite.

The catalytic activity of this mixture was wholly unexpected, particularly since metal hydrides either singly or in admixture with transition element halides had not been known to possess catalytic activity for forming crystalline polymers of propylene and higher olefins, and the third component of the catalyst is not a polymerization catalyst. The inventive process is carried out in liquid phase in an inert organic liquid and preferably an inert liquid hydrocarbon vehicle. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene, although it can be used for polymerizing ethylene, mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 to lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are particularly useful for polymerizing propylene to form a crystalline, high-density polymer. The polypropylene produced has a softening point above 155° C. and a density of 0.91 and higher. Usually, the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above, the improved results obtained in accordance with this invention depend upon the particular catalyst combination. Thus, one of the components of the catalyst is a hydride of a metal from Groups Ia and IIa. Specifically, hydrides containing the above metals and another metal such as aluminum, for example, sodium aluminum hydride, lithium aluminum hydride, and the like, can be used in the catalyst compositions. Another component of the catalyst composition is a halide of a transition metal selected from the group consisting of titanium, zirconium, vanadium, chromium and molybdenum. In these compounds the transition metal is preferably at its maximum valence, but a compound of a transition metal having a reduced valence can be used. Also, the halogen is selected from the group consisting of chlorine, bromine and iodine. Such compounds as titanium tetrachloride, titanium trichloride, titanium dichloride, titanium tetrabromide, titanium tetraiodide, titanium tribromide and titanium triodide can be used in the catalyst composition. Similar halides of zirconium, vanadium, chromium and molybdenum can also be used. For the most desirable results it is preferred to use a halide of titanium having either its maximum valency or a reduced valency and specifically it is preferred to employ either titanium tetrachloride or titanium trichloride in the catalyst composition. The third component of the catalyst composition is an amide as defined above.

The limiting factor in the temperature of the process appears to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of hydride to transition metal halide can be varied within the range of 1:0.5 to 1:2, and the molar ratio of hydride to the third component of the catalytic mixture can be varied within the range of 1:1 to 1:0.25, but it will be understood that higher and lower molar ratios are within the scope of invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin and any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with polymerizable $\alpha$-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other $\alpha$-monoolefins in accordance with this invention is a mixture of lithium aluminum hydride, titanium tetrachloride and N,N-dimethylformamide. The importance of the various components of this reaction mixture is evident from the fact that a mixture of the hydride and chloride is relatively ineffective for polymerizing propylene to crystalline polymer and large amounts of oils and rubbers are produced in a propylene polymerization. However, when the above formamide or other third compound within the scope of this invention is added to the mixture the resulting catalyst composition is highly effective for polymerizing propylene to form a highly crystalline high density, high softening polymer without the formation of oils and rubbers.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of the invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols, such as methanol.

The catalyst compositions have been described above as being effective primarily for the polymerization of α-monoolefins. These catalyst compositions can, however, be used for polymerizing other α-olefins, and it is necessary to limit the process of the invention to monoolefins. Other α-olefins that can be used are butadiene, isoprene, 1,3-pentadiene and the like.

The following examples are illustrative of this invention.

Example 1

This example illustrates the relatively large quantity of rubbery polymer obtained in polymerizing propylene with a two-component metal hydride-transition metal compound catalyst. In a nitrogen-filled dry box a 1-g. catalyst charge comprising equimolar quantities of lithium hydride and titanium tetrachloride was added to a 300-ml. autoclave along with 100 ml. of dry heptane. The autoclave was capped, removed from the dry box, placed in a rocker, and charged with 100 ml. of liquid propylene from a blow case. The autoclave was rocked, heated to 175° C., and maintained under these conditions for 16 hours. At the end of this period the resulting polymer was washed several times with dry methanol and then with water. The weight of the polypropylene was 16.5 g. having a density of 0.893 and an inherent viscosity in tetralin at 145° C. of 2.22. This material was extracted with butyl ether at 70° C. whereupon all but 2.5 g. of the product was found to be ether-soluble. The ether-insoluble fraction, amounting to about 15% of the total product, was crystalline and had a density of 0.918. The ether-soluble material was a rubbery, amorphous form of polypropylene.

When titanium trichloride replaced the titanium tetrachloride under the above conditions, a slight increase in crystallinity of the product was noted. However, the yield of polymer was substantially decreased. There was obtained 7.0 g. of polypropylene having a density of 0.902 and an inherent viscosity of 2.70. After extraction with butyl ether, the residual highly crystalline polypropylene weighed 1.6 g. and had a density of 0.918.

Example 2

The procedure of Example 1 was followed using a 1-g. catalyst charge comprising a 1:1:0.5 molar ratio of lithium hydride, titanium tetrachloride and N,N-dimethylforamide. The 14.2 g. of highly crystalline polypropylene produced had a density of 0.915 and an inherent viscosity of 2.02.

When titanium trichloride was used in place of titanium tetrachloride in the above three-component catalyst system, the yield of highly crystalline polypropylene was 12.5 g. of 0.918 density and 2.95 inherent viscosity.

Example 3

The procedure of Example 1 was followed using a 2-g. catalyst charge comprising a 1:0.5:0.1 molar ratio of calcium hydride, vanadium trichloride and N,N-dimethylacetamide. However, in this run no inert solvent was employed and the reaction temperature was 85° C. The product was 19.0 g. of highly crystalline polypropylene of density 0.918 and inherent viscosity 2.45.

N,N-diethylacetamide, N-cyclohexylacetamide, and N,N,N',N'-tetramethyladipamide can be used in place of the above N,N-dimethylacetamide to produce desirable results.

Example 4

The procedure of Example 1 was followed except that the catalyst charge was 0.1 g. of a mixture of sodium hydride, titanium trichloride and ethyl oxanilate in a molar ratio of 1:1:0.25. No solvent was employed and the polymerization temperature was 250° C. The highly crystalline polypropylene obtained had a density of 0.913 and an inherent viscosity of 1.05.

The titanium trichloride can be replaced by zirconium tetrachloride, chromic chloride or molybdenum pentachloride. Also, the sodium hydride can be replaced by an equimolar quantity of lithium aluminum hydride.

Example 5

3-methyl-1-butene was polymerized following the procedure of Example 1 using a 1.5-g. catalyst charge comprising a 1:1:0.1 molar ratio of barium hydride, titanium trichloride and palmitamide. No inert solvent was used. A 25.0-g. yield of highly crystalline poly-3-methyl-1-butene was formed having an inherent viscosity of 2.04.

In the same manner, highly crystalline polyolefins were obtained from 1-butene, 1-pentene, 4-methyl-1-pentene styrene and vinylcyclohexane.

Example 6

The procedure of Example 1 was followed except that the catalyst charge was 1 gram of a mixture of lithium hydride, titanium trichloride and N-t-butylbenzamide in a molar ratio of 1:1:0.5. No solvent was employed and the polymerization temperature was 85° C. The crystalline polypropylene obtained had a density of 0.911 and an inherent viscosity of 1.88.

Other amides that can be used in place of N-t-butylbenzamide are N-methyl-N-phenylacetamide, N-benzylacetamide, n-heptamide, stearanilide, acetanilide, isobutyramide, N-N'-di-t-butylurea, tetramethylurea, succinimide, N-methylisobutyramide, N-benzoylmorpholine, N,N'-diacetylpiperazine, n-butyl oxamate, ethyl carbamate, ethyl N,N-tetraethylamidophosphate, dimethyl N-dimethylamidophosphate, N,N,N-hexamethyl triamidophosphite and dimethyl N-dimethylamidophosphite.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-olefins containing 2 to 10 carbon atoms to form solid crystalline polymer, the improvement which comprises catalyzing the polymerization with a catalytic mixture consisting essentially of a hydride of a metal selected from the group consisting of alkali metals and alkaline earth metals, a halide of a transition metal selected from the group consisting of titanium, vanadium, zirconium, chromium and molybdenum and a third component selected from the amides having the formulas:

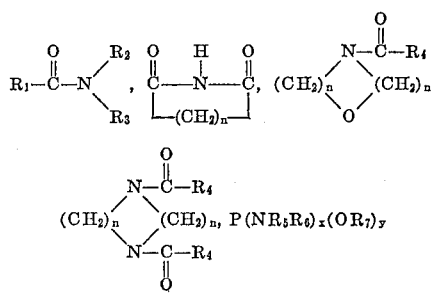

and

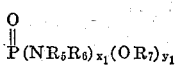

wherein $R_1$ is a radical selected from the group consisting of alkyl radicals containing 1 to 20 carbon atoms, phenyl, carboxyl, alkoxy, —$N(R)_2$ wherein R is an alkyl radical containing 1 to 4 carbon atoms and

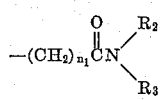

wherein $n_1$ is an integer of 1 to 4, each of $R_2$ and $R_3$ is a radical selected from the group consisting of hydrogen, alkyl radicals containing 1 to 8 carbon atoms, phenyl and cyclohexyl and wherein $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3 and $x_1$ and $y_1$ are whole numbers from 1 to 2, the sum of $x_1$ and $y_1$ being 3 the molar ratio of hydride to third component being within the range of 1:1 to 1:0.25.

2. As a composition of matter, a catalytic mixture consisting essentially of a hydride of a metal selected from the group consisting of alkali metals and alkaline earth metals, a halide of a transition metal selected from the group consisting of titanium, vanadium, zirconium, chromium and molybdenum and a third component selected from the amides having the formulas:

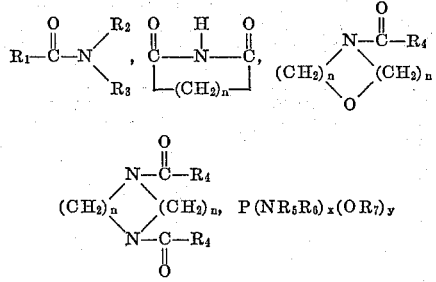

and

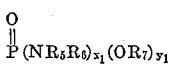

wherein $R_1$ is a radical selected from the group consisting of alkyl radicals containing 1 to 20 carbon atoms, phenyl, carboxyl, alkoxy, —$N(R)_2$ wherein R is an alkyl radical containing 1 to 4 carbon atoms and

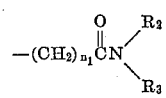

wherein $n_1$ is an integer of 1 to 4, each of $R_2$ and $R_3$ is a radical selected from the group consisting of hydrogen, alkyl radicals containing 1 to 8 carbon atoms, phenyl and cyclohexyl and wherein $R_4$ is a radical selected from the group consisting of alkyl radicals containing 1 to 4 carbon atoms and phenyl and $n$ is an integer of 1 to 4, and wherein $R_5$, $R_6$ and $R_7$ are alkyl radicals containing 1 to 8 carbon atoms, $x$ and $y$ are whole numbers from 1 to 3 and 0 to 2, respectively, the sum of $x$ and $y$ being 3, and $x_1$ and $y_1$ are whole numbers from 1 to 2, the sum of $x_1$ and $y_1$ being 3, the molar ratio of hydride to third component being within the range of 1:1 to 1:0.25.

3. In the polymerization of propylene to form solid crystalline polymer, the improvement which comprises effecting the polymerization in the presence of a catalytic mixture consisting essentially of a hydride of an alkali metal, a titanium halide and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of alkali metal hydride to third component being within the range of 1:1 to 1:0.25.

4. In the polymerization of propylene to form solid crystalline polymer, the improvement which comprises effecting the polymerization in the presence of a catalytic mixture consisting essentially of a hydride of an alkali metal, a titanium halide and a third component selected from the amides having the formula:

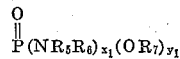

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of alkali metal hydride to third component being within the range of 1:1 to 1:0.25.

5. In the polymerization of propylene to form solid crystalline polymer, the improvement which comprises effecting the polymerization in the presence of a catalytic mixture consisting essentially of lithium hydride, titanium trichloride and N,N-dimethylformamide, the molar ratio of lithium hydride to N,N-dimethylformamide being within the range of 1:1 to 1:0.25.

6. The method according to claim 5 wherein vanadium trichloride is used in the catalyst mixture in place of titanium trichloride.

7. The method according to claim 5 wherein N,N-dimethylacetamide is used in the catalyst mixture in place of N,N-dimethylformamide.

8. In the polymerization of propylene to form solid crystalline polymer, the improvement which comprises effecting the polymerization in the presence of a catalytic mixture consisting essentially of lithium aluminum hydride, titanium tetrachloride and N,N,N',N'-tetramethyladipamide, the molar ratio of lithium aluminum hydride to N,N,N',N'-tetramethyladipamide being within the range of 1:1 to 1:0.25.

9. In the polymerization of propylene to form solid crystalline polymer, the improvement which comprises effecting the polymerization in the presence of a catalytic mixture consisting essentially of calcium hydride, titanium tetrachloride and ethyl N,N-tetraethyl amidophosphate, the molar ratio of calcium hydride to ethyl-N,N-tetraethyl amidophosphate being within the range of 1:1 to 1:025.

10. In the polymerization of propylene to form solid crystalline polymer, the improvement which comprises effecting the polymerization in the presence of a catalytic mixture consisting essentially of a hydride of an alkali metal, a titanium halide and a third component selected from the amides having the formula:

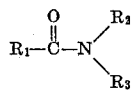

wherein $R_1$ is a radical selected from the group consisting of alkyl radicals containing 1 to 20 carbon atoms, phenyl, carboxyl, alkoxy, —$N(R)_2$ wherein R is an alkyl radical containing 1 to 4 carbon atoms and

wherein $n_1$ is an integer of 1 to 4 and each of $R_2$ and $R_3$ is a radical selected from the group consisting of hydrogen, alkyl radicals containing 1 to 8 carbon atoms, phenyl and cyclohexyl, the molar ratio of alkali metal hydride to third component being within the range of 1:1 to 1:0.25.

11. As a composition of matter, a catalytic mixture consisting essentially of a hydride of an alkali metal, a titanium halide and a third component selected from the amides having the formula:

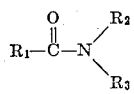

wherein $R_1$ is a radical selected from the group consisting of alkyl radicals containing 1 to 20 carbon atoms, phenyl, carboxyl, alkoxy, $-N(R)_2$ wherein R is an alkyl radical containing 1 to 4 carbon atoms and

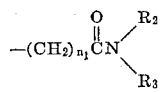

wherein $n_1$ is an integer of 1 to 4, and each of $R_2$ and $R_3$ is a radical selected from the group consisting of hydrogen, alkyl radicals containing 1 to 8 carbon atoms, phenyl and cyclohexyl, the molar ratio of alkali metal hydride to third component being within the range of 1:1 to 1:0.25.

12. As a composition of matter, a catalytic mixture consisting essentially of a hydride of an alkali metal, a titanium halide and a third component selected from the amides having the formula $P(NR_5R_6)_x(OR_7)_y$ wherein $R_5$, $R_6$ and $R_7$ are alkyl radicals containing 1 to 8 carbon atoms, and $x$ and $y$ are whole numbers from 1 to 3 and 0 to 2, respectively, the sum of $x$ and $y$ being 3, the molar ratio of alkali metal hydride to third component being within the range of 1:1 to 1:0.25.

13. As a composition of matter, a catalytic mixture consisting essentially of a hydride of an alkali metal, a titanium halide and a third component selected from the amides having the formula:

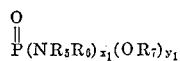

wherein $R_5$, $R_6$ and $R_7$ are alkyl radicals containing 1 to 8 carbon atoms, and $x_1$ and $y_1$ are whole numbers from 1 to 2, the sum of $x_1$ and $y_1$ being 3, the molar ratio of alkali metal hydride to third component being within the range of 1:1 to 1:0.25.

14. As a composition of matter, a catalytic mixture consisting essentially of lithium hydride, titanium trichloride and N,N-dimethylformamide, the molar ratio of lithium hydride to N,N-dimethylformamide being within the range of 1:1 to 1:0.25.

15. A composition according to claim 14 wherein vanadium trichloride is used in the catalyst mixture in place of titanium trichloride.

16. A composition according to claim 14 wherein N,N-dimethylacetamide is used in the catalyst mixture in place of N,N-dimethylformamide.

17. As a composition of matter, a catalytic mixture consisting essentially of lithium aluminum hydride, titanium tetrachloride and N,N,N',N'-tetramethyladipamide, the molar ratio of lithium aluminum hydride to N,N,N',N'-tetramethyladipamide being within the range of 1:1 to 1:0.25.

18. As a composition of matter, a catalytic mixture consisting essentially of calcium hydride, titanium tetrachloride and ethyl N,N-tetraethyl amidophosphate, the molar ratio of calcium hydride to ethyl-N,N-tetraethyl amidophosphate being within the range of 1:1 to 1:0.25.

References Cited by the Examiner

UNITED STATES PATENTS

| | | | |
|---|---|---|---|
| 2,886,561 | 5/59 | Reynolds et al. | 260—94.9 |
| 2,905,645 | 9/59 | Andersen et al. | 252—429 |
| 2,965,627 | 12/60 | Field et al. | 260—93.7 |
| 2,967,856 | 1/61 | Coover et al. | 260—93.7 |
| 2,996,459 | 8/61 | Andersen et al. | 252—429 |
| 3,058,969 | 10/62 | Coover et al. | 260—93.7 |
| 3,088,942 | 5/63 | Coover | 260—93.7 |

JOSEPH L. SCHOFER, *Primary Examiner.*

LESLIE H. GASTON, WILLIAM H. SHORT,
*Examiners.*